United States Patent
Auclair (10) Patent No.: US 6,710,251 B2
(45) Date of Patent: Mar. 23, 2004

(54) FIBER OPTIC CABLE SHIELD BOND SYSTEM

(75) Inventor: William T. Auclair, Winsted, CT (US)

(73) Assignee: Electric Motion Company, Inc., Winsted, CT (US)

( * ) Notice: Subject to any disclaimer, the term of this patent is extended or adjusted under 35 U.S.C. 154(b) by 124 days.

(21) Appl. No.: 09/862,385

(22) Filed: May 22, 2001

(65) Prior Publication Data

US 2002/0176674 A1 Nov. 28, 2002

(51) Int. Cl.[7] .............................................. H02G 15/02
(52) U.S. Cl. ..................... 174/74 R; 174/78; 385/100
(58) Field of Search .............................. 174/74 R, 78, 174/75 D, 84 R, 88 R; 439/98, 99, 100, 112; 385/100, 101, 139, 135

(56) References Cited

U.S. PATENT DOCUMENTS

| | | | | |
|---|---|---|---|---|
| 3,757,269 A | * | 9/1973 | Baumgartner et al. | 439/99 |
| 3,787,797 A | * | 1/1974 | Kurz | 439/391 |
| 4,257,658 A | * | 3/1981 | Hammond et al. | 174/78 |
| 4,895,525 A | * | 1/1990 | Leonardo | 439/99 |
| 4,986,761 A | * | 1/1991 | Gladden et al. | 174/6 |
| 5,131,856 A | * | 7/1992 | Auclair | 24/280 |
| 5,491,766 A | * | 2/1996 | Huynh et al. | 385/100 |
| 5,722,840 A | * | 3/1998 | Auclair et al. | 439/793 |
| 6,040,525 A | * | 3/2000 | Chauquet et al. | 174/40 CC |

* cited by examiner

*Primary Examiner*—William H. Mayo, III
(74) *Attorney, Agent, or Firm*—Alix, Yale & Ristas, LLP (57) ABSTRACT

A fiber optic cable shield bond system provides reliable, weather resistant ground connections to the conductive shield of a fiber optic cable. The system includes a cable shield connector having a rigid, electrically conductive bond plate which is mounted to the fiber optic cable by at least one hose clamp. At least one ground connector in electrical communication with the bond plate penetrates the protective jacket of the fiber optic cable to electrically connect the bond plate to the cable shield. A harness assembly mounted to the bond plate may be connected to a ground point and thereby ground the conductive shield of the fiber optic cable.

13 Claims, 6 Drawing Sheets

FIBER OPTIC CABLE SHIELD BOND SYSTEM

BACKGROUND OF THE INVENTION

This invention relates generally to devices for implementing a ground connection between a metallic shield of a cable and a common ground point. More particularly, the present invention relates to devices which mount to fiber optic cables and implement a ground connection via a flexible conductor.

Fiber optic cables are generally buried under ground and typically constructed in a tubular fashion with numerous fiber optic conductors surrounded by a conductive ground shield which is in turn surrounded by a protective jacket of tough flexible plastic or rubber. Many fiber optic cables also include steel cords running the length of the cable, positioned between the conductive shield and the protective jacket, which protect the fragile inner conductors and reinforce the cable. To function properly and safely, cable shields must be grounded at spaced ground points established by regulation and/or operational specifications and practices.

Cable shield ground assemblies are ordinarily positioned within a cabinet, housing or other enclosure to provide a common ground point and shelter for the cables and attached grounding assemblies. Such enclosures are frequently located outdoors and/or underground, where the enclosures and their contents are subjected to intense environmental changes. It is not uncommon for the enclosure to be exposed to moisture in the form of rain, ground water or condensation. Temperature swings from well below freezing to above 100° F. are not uncommon.

Establishing reliable electrical connections between the conductive shield of fiber optic cables and a common ground point presents difficulties well known in the art. Conventionally, craft personnel must cut through the protective jacket and expose the metallic shield prior to affixing any clamp or other device for establishing a ground path. Any such cutting or piercing of the protective shield by craft personnel makes the fiber optic conductors and linear strength members susceptible to being damaged, weakened or cut with the potential for delays and costly repairs. Costs are further increased by the specialized training and equipment required to prepare craft personnel to perform the task of cutting the cable shield.

SUMMARY OF THE INVENTION

Briefly stated, the invention in a preferred form is a fiber optic cable shield bond system for establishing a reliable ground path from the conductive shield of a fiber optic cable to a common ground point via a flexible conductor. A preferred form of the fiber optic cable shield bond system includes a cable shield connector having a rigid, electrically conductive bond plate which is mounted to the fiber optic cable by at least one hose clamp. At least one ground connector in electrical communication with the bond plate penetrates the protective jacket of the fiber optic cable to electrically connect the bond plate to the cable shield. A harness assembly mounted to the bond plate may be connected to a ground point and thereby ground the conductive shield of the fiber optic cable.

The bond plate includes first and second side portions forming an obtuse angle therebetween and defining a longitudinal channel with open ends. The bond plate also includes first and second end portions and a middle portion disposed longitudinally therebetween. The first side portion of the bond plate has at least one threaded opening and the second side portion has a threaded opening and an unthreaded guide hole, the threaded openings being disposed in the middle portion of the bond plate.

The ground connector comprises a grounding screw including a driving head, a threaded shank axially extending from the head and terminating in a cutting edge which forms the extreme distal tip of said grounding screw. One of the grounding screws is threadably mounted within each of the threaded openings. The shank of the grounding screw has an axial recess extending from the distal tip to a point intermediate the distal tip and the driving head, the cutting edge forming a sharpened hollow point.

The harness assembly comprises a electrically conductive flexible cable and a electrically conductive, substantially rigid wire, with one end portion of the flexible cable being mounted to one end portion of the rigid wire. The other end portion of the flexible cable is mounted to the bond plate and the other end portion of the rigid wire may be mounted to the ground point.

To install the system, the bond plate is positioned adjacent the protective jacket of the fiber optic cable and at least one of the end portions of the bond plate is clamped to the cable with a hose clamp. Each grounding screw is tightened until the cutting edge penetrates the protective jacket of the cable and makes electrical contact with the cable shield. The rigid wire is connected to the ground point to complete the ground circuit.

The bolt on each hose clamp has a break-away cap, the bolt is tightened until the break-away cap breaks off, ensuring that the proper amount of compressive force is applied to the bond plate and fiber optic cable. A drill bit having a hardness which is greater than the hardness of the protective jacket but less than the hardness of the conductive shield is inserted through the guide hole of the bond plate to engage the protective jacket. The drill bit is rotated to remove the protective jacket exposed by the guide hole, thereby forming an opening in the protective jacket.

One of the probes of a continuity test device is engaged with the hose clamp and the other probe is inserted through the guide hole and the opening in the protective jacket to contact the conductive shield. A first of the grounding screws is tightened until a reading is obtained on the continuity test device, indicating electrical contact between the grounding screw and the conductive shield. The first grounding screw is then backed-off until the continuity test device indicates that electrical contact has been broken. Each remaining grounding screw is initially engaged with the shield in the same manner. Each grounding screw is then tightened one half a turn, ensuring proper contact with the shield. The opening in the protective shield may then be sealed with a sealing material if desired.

An object of the invention is to provide a new and improved connector for establishing and maintaining a high quality ground connection with a fiber optic cable shield.

Another object of the invention is to provide a new and improved fiber optic cable shield bond system which does not require opening of the cable shield prior to installation.

A further object of the invention is to provide a new and improved fiber optic cable shield bond system that minimizes damage to the fiber optic cable jacket while establishing reliable grounding of the fiber optic cable shield.

A yet further object of the invention is to provide a new and improved fiber optic cable shield bond system which reduces labor costs and craft error.

A yet further object of the invention is to provide a new and improved fiber optic cable shield bond system having improved water, weather and environmental resisting capabilities.

Other objects and advantages of the invention will become apparent from the specification and the drawings.

DETAILED DESCRIPTION OF THE PREFERRED EMBODIMENT

Figure 1:
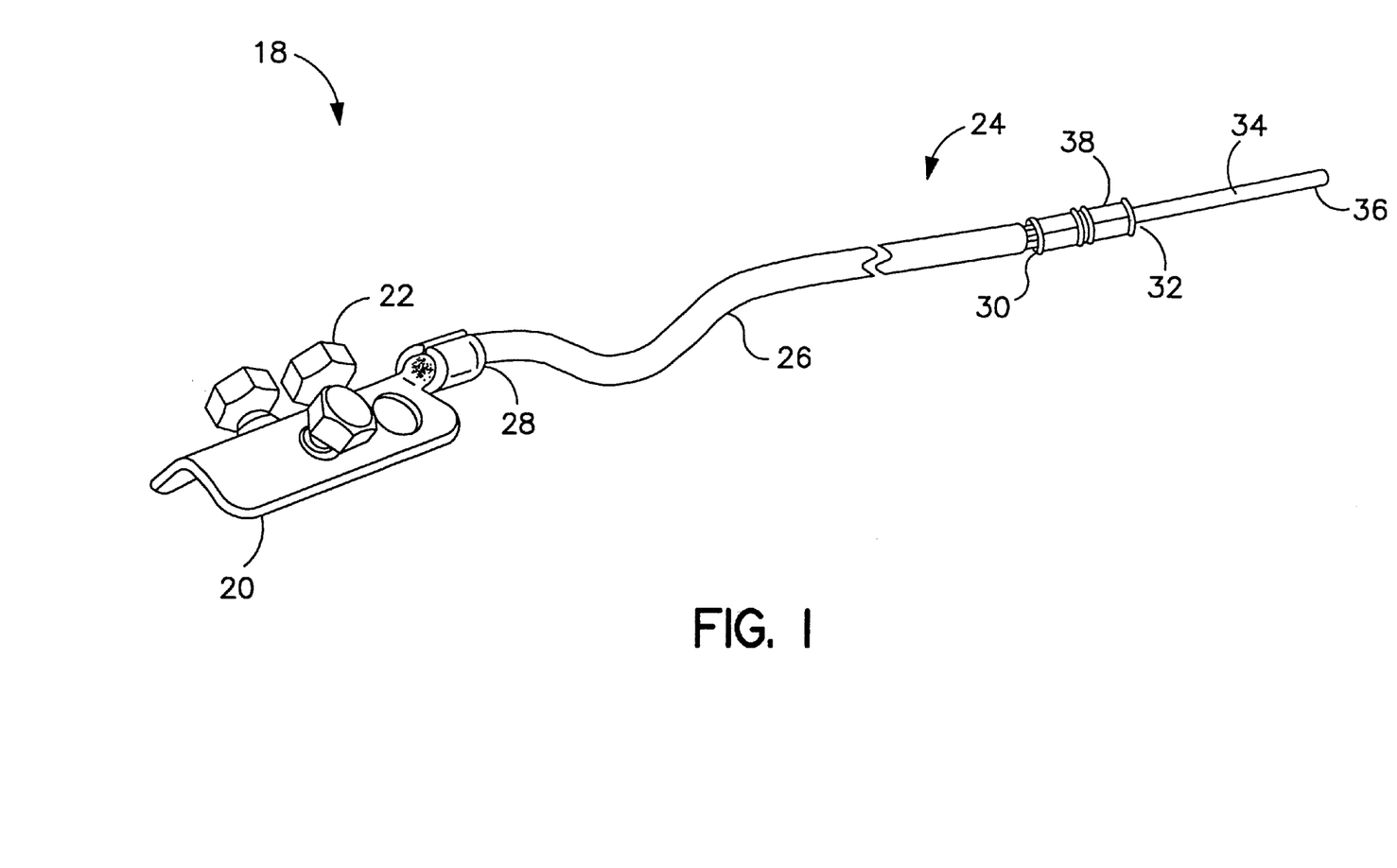
FIG. 1 is a perspective view of the cable shield connector of a fiber optic cable shield bond system in accordance with the present invention.

With reference to the drawings wherein like numerals represent like parts throughout the Figures, a fiber optic cable shield bond system in accordance with the present invention is generally designated by the numeral 10. The fiber optic cable shield bond system 10 is particularly adapted for establishing a reliable ground connection with the conductive shield 12 of a fiber optic cable 14 without a significant disruption of the cable jacket 16. As shown in FIG. 1, the fiber optic cable shield bond system 10 includes a cable shield connector 18 having a bond plate 20, multiple fasteners 22 for connecting the bond plate 20 to the cable shield 12, and a harness assembly 24 mounted to the bond plate 20.

The harness assembly 24 includes a flexible electrically conductive cable 26 having a first end portion 28 mounted to the bond plate 20 and an oppositely disposed second end portion 30 mounted to a first end portion 32 of an electrically conductive, substantially rigid wire 34. The second end portion 36 of the wire 34 acts as a male connector for mounting to a ground system. Preferably, the flexible cable 26 is a #6 AWG rope lay cable and the rigid wire 34 is a #6 AWG solid tinned wire. The flexible cable 26 is mounted to the rigid wire 34 by a conventional electrical connector 38.

Figure 2:
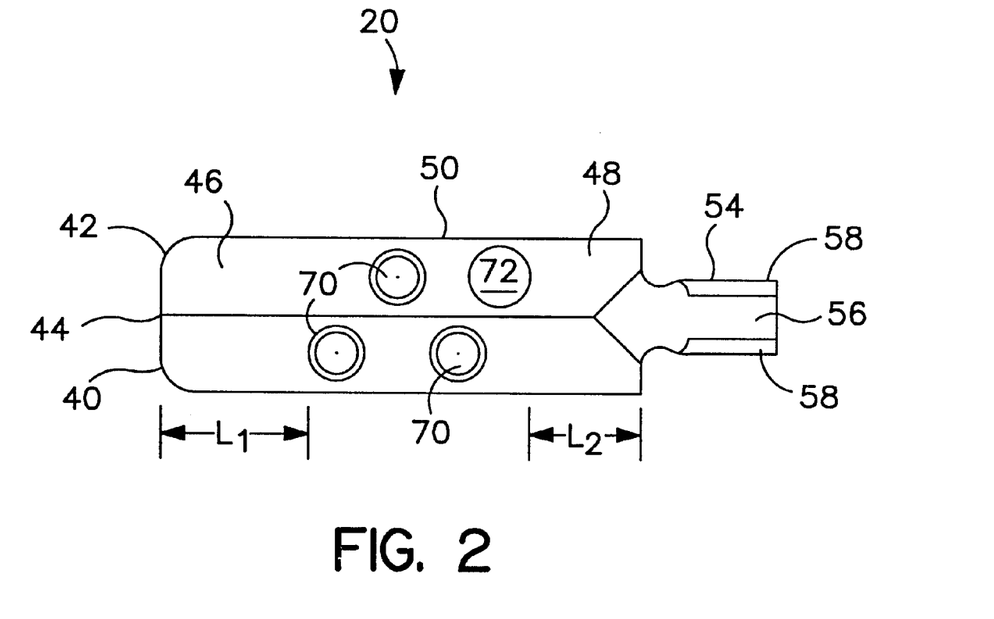
FIG. 2 is an enlarged top view of the bond plate of the cable shield connector of FIG. 1.
Figure 3:
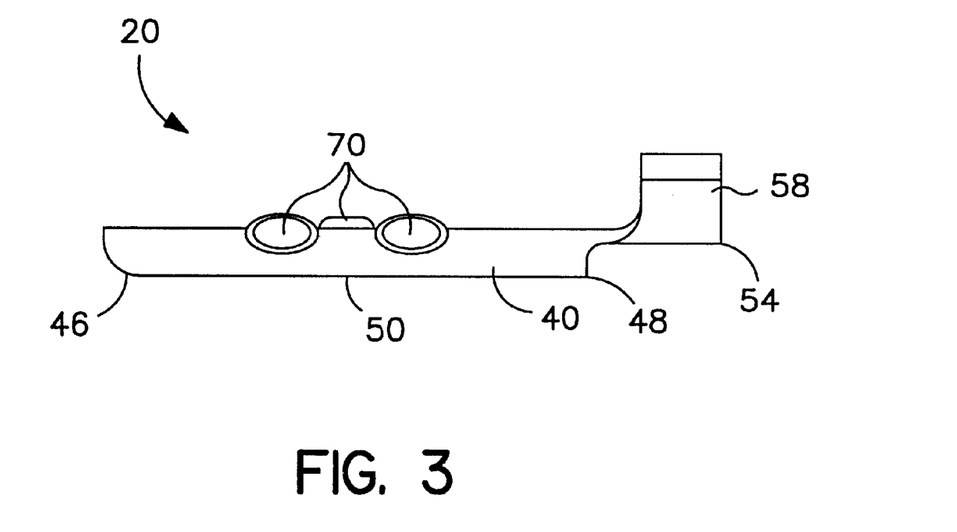
FIG. 3 is a side view of the bond plate of the cable shield connector of FIG. 2.
Figure 4:
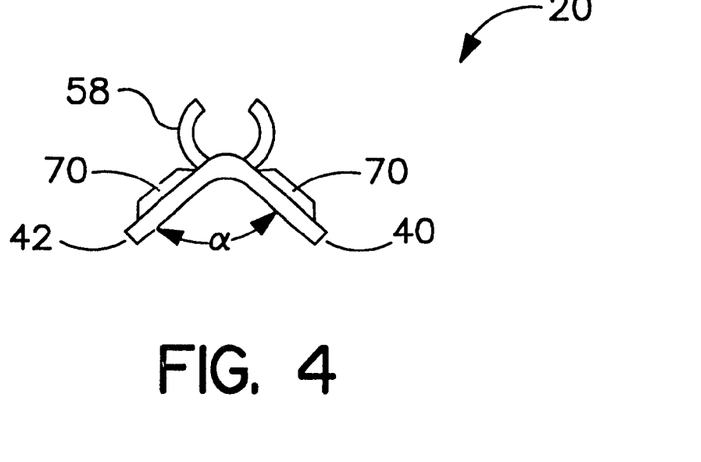
FIG. 4 is a front view of the bond plate of the cable shield connector of FIG. 2.
Figure 5:
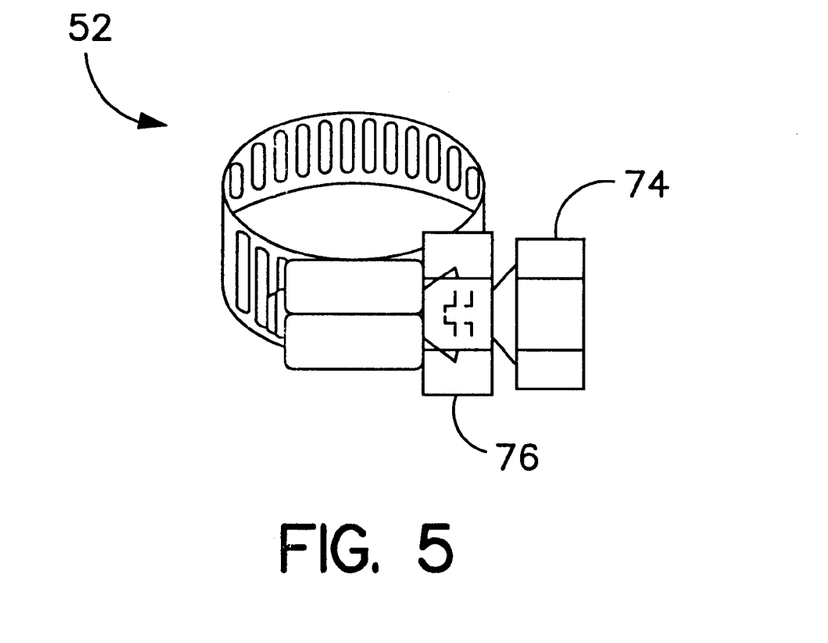
FIG. 5 is a perspective view of a hose clamp of the fiber optic cable shield bond system.

With further reference to FIGS. 2–4, the bond plate 20 is preferably constructed from cold rolled steel or similar structurally rigid conductive material. The bond plate 20 has first and second side portion 40, 42 forming an angle ∝ of approximately one hundred and thirty five degrees (135°) therebetween and defining a longitudinal channel with open ends. The bend-line 44 between the side portions 40, 42 defines a longitudinally extending axis. The bond plate 20 also has first and second end portions 46, 48 and a middle portion 50 disposed longitudinally therebetween. The length of L1 the first end portion 46 and the length L2 of the second end portion 48 each are sufficiently long to fully engage a hose clamp 52 for installing the cable shield connector 18 on the fiber optic cable 14, as explained further below.

A mounting segment 54 extends from the second end portion 48 of the bond plate 20. The mounting portion 54 has a base 56 and a pair of wings 58 extending laterally from the base 56. To mount the bond plate 20 to the harness assembly 24, the first end portion 28 of the flexible cable 26 is placed against the base 56 and the wings 58 are crimped onto the base 56 and the cable 26 to mechanically mount the bond plate 20 to the harness assembly 24 and electrically connect the bond plate 20 to the cable 26.

Figure 6:
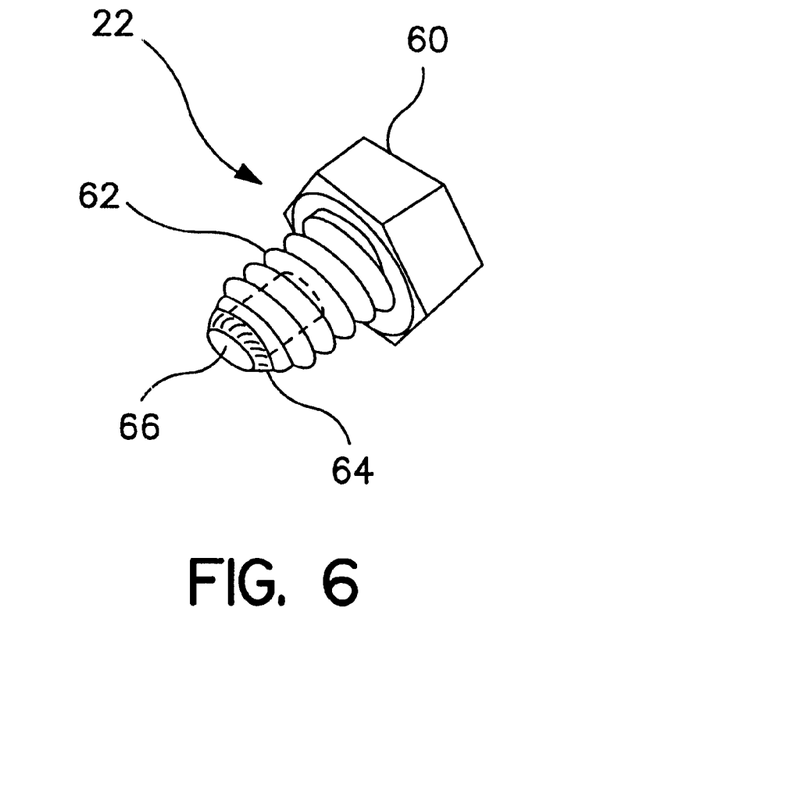
FIG. 6 is an enlarged perspective side view of one of the grounding screws of the cable shield connector of FIG. 1.
Figure 7:
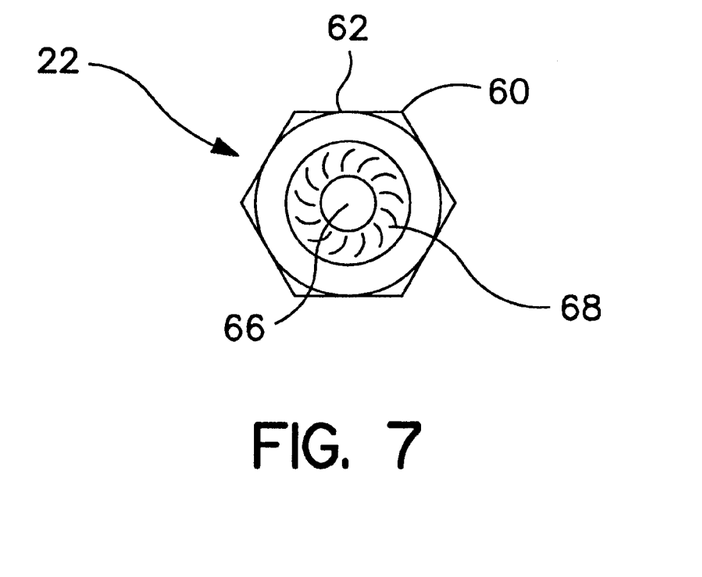
FIG. 7 is a bottom view of the grounding screw of FIG. 6.

With reference to FIGS. 6 and 7, a grounding screw 22 according to the present invention has a radially enlarged driving head 60, a threaded shaft 62 integrally projecting from the head 60 and a sharpened cutting tip 64 which surrounds an axial recess 66 in the shaft 62. The cutting tip 64 may be serrated 68 to aid in penetrating the jacket 16 and removing any coating on the shield 12 which may interfere with electrical contact.

The first side portion 40 of the bond plate 22 has at least one, and preferably two, threaded openings 70 located in the middle portion 50 of the bond plate 20 for engaging the threaded shaft 62 of a fastener 22. The second side portion 42 has one threaded opening 70 and one unthreaded guide hole 72 located in the middle portion 50 of the bond plate 20. Threaded openings 70 are positioned such that the cutting tips 64 of grounding screws 22 received therein are aligned with and oriented toward the axis. The number and arrangement of grounding screws 22 creates multiple opportunities to contact the cable shield 12 from several angles on each side of the cable 14.

Figure 8A:
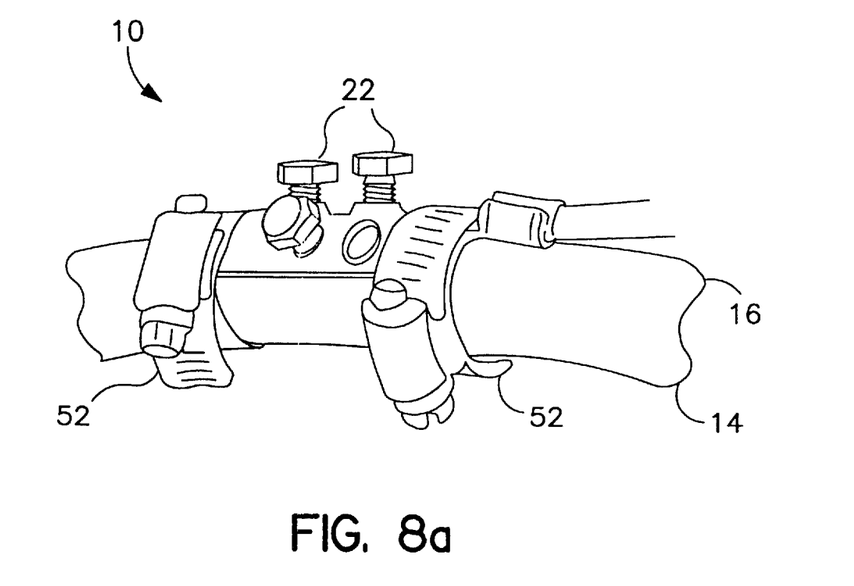
FIGS. 8a–8c illustrate the installation of fiber optic cable shield bond system on a fiber optic cable.

FIG. 8a illustrates the fiber optic cable shield bond system 10 in an installed configuration, mounted on a fiber optic cable 14 (partially illustrated). The fiber optic cable 14 has a conventional structure which includes fiber optic conductors (not shown) centrally located in the cable, a protective jacket 16 enveloping the cable and a conductive shield 12 and linear strength members (FIG. 8c) disposed intermediate the fiber optic conductors and the protective jacket 16. The cable shield connector 18 is mounted to the fiber optic cable 14 by a pair of hose clamps 52 which wrap around the protective jacket 16 of the cable 14, the first end portion 46 of the bond plate 20, and the second end portion 48 of the bond plate 20 intermediate middle portion 50 and mounting segment 54. The bolt 74 of each hose clamp 52 is tightened until the break-away cap 76 breaks off. The amount of force required to separate the break-away cap 76 is selected to ensure that the proper amount of torque is applied to properly mount the bond plate 20 without crushing the cable shield 12.

Figure 8B:
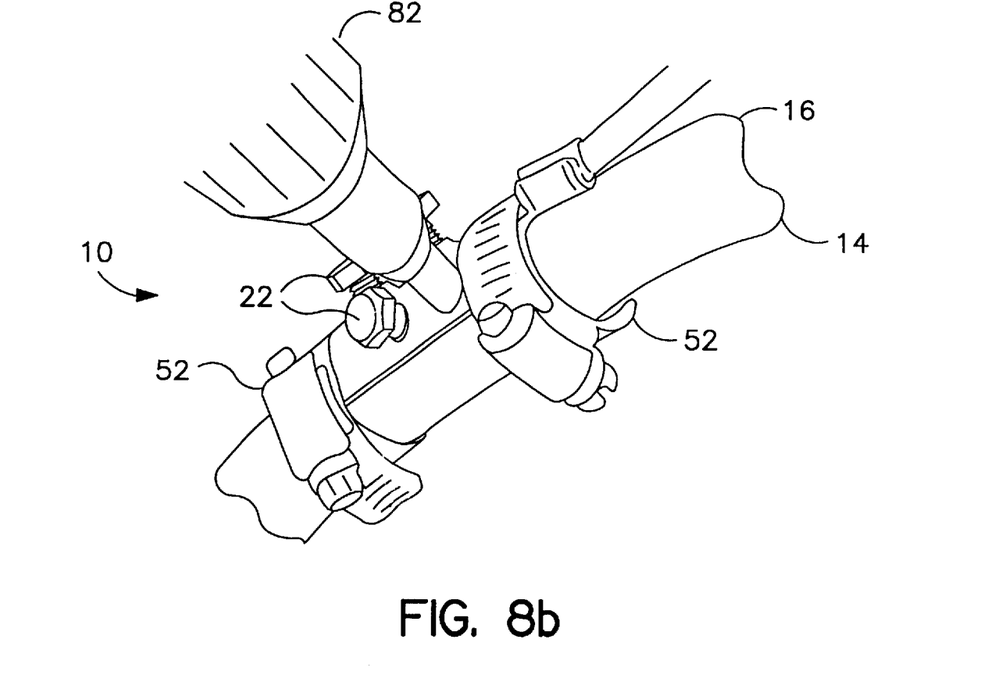

As shown in FIG. 8b, a drill bit 78 or plug cutter is inserted through the guide hole 72 such that the cutting head 80 of the bit/cutter 78 engages the outer surface of the protective jacket 16. A drill 82 rotates the bit/cutter 78 to remove substantially the entire portion of the protective jacket 16 which is exposed within the guide hole 72. The opening 84 in the protective jacket 16 created by the bit/cutter 78 exposes the portion of the shield 12 directly under guide hole 72. The bit/cutter 78 is composed of a material, preferably a polymer material, that is harder than the material of the protective jacket 16 but softer than the material of the shield 12 and strength members, thereby ensuring that the bit/cutter 78 cannot cause harm to the shield 12 and strength members.

Figure 8C:
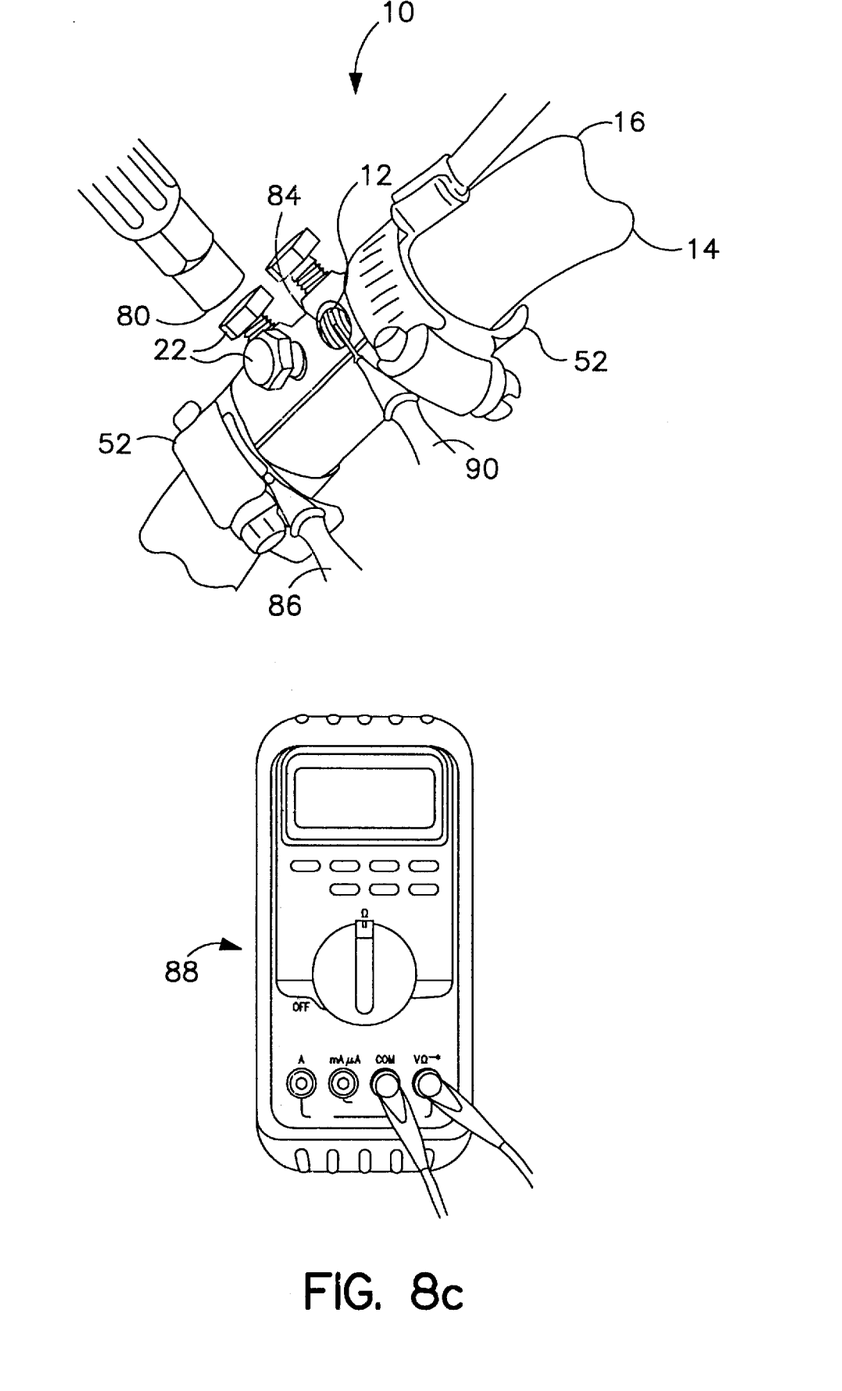

With reference to FIG. 8c, one probe 86 of a continuity test device 88, such as a continuity tester or a multimeter operating in continuity test mode, is positioned to engage on of the hose clamps 52 and the second probe 90 is inserted through the guide hole 72 and the opening 84 in the protective jacket 16 to contact the shield 12. A first of the grounding screws 22 is tightened until a reading is obtained on the continuity test device 88, indicating that the cutting tip 64 of the grounding screw 22 has cut through the protective jacket 16 of the fiber optic cable 14 to mechanically and electrically contact the shield 12. The grounding screw 22 is then backed-off one quarter of a turn, or until the continuity test device 88 indicates that electrical contact has been broken. This procedure is repeated with the second and third grounding screws 22, leaving all three grounding screws 22 in the backed-off position. Each of the grounding screws 22 is then tightened one half a turn, assuring full electrical contact with the shield 12 while preventing crushing or otherwise damaging the shield 12. Opening 84, and preferably guide hole 72, may be filled with potting compound, caulk, or other material known in the art to seal the protective jacket 16 against intrusion by water.

When fully tightened, the threaded shaft 62 of each grounding screw 22 contacts the surface of the respective threaded opening 70 and the cutting tip 64 of the grounding screw 22 contacts the conductive shield 12 of the fiber optic cable 14 establishing a conductive path from the shield 12 to the second end portion 36 of rigid wire 34. As the grounding screw 22 penetrates the protective jacket 16, a core of jacket material is formed within the longitudinal recess 66 of the shaft 62 of the grounding screw 22. The longitudinal recess 66 allows jacket material to migrate into the recess 66 while the serrated, angled cutting tip 64 displaces jacket material to the sides. The unique construction of the grounding screw 22, with its longitudinal recess 66 and serrated angled cutting tip 64 efficiently penetrates the thick tough 15 jacket material to establish superior electrical contact with the cable shield 12. After installation, the displaced jacket material engages the shaft 62 of each grounding screw 22 to effect a substantially water tight seal.

Thus, a fiber optic cable shield bond system 10 according to the present invention can establish a reliable multi-point ground connection with the conductive shield 12 of a fiber optic cable 14 while leaving the cable jacket 16 largely intact. No special tools or skills are required to affect a ground connection using the inventive fiber optic cable shield bond system 10.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention

What is claimed is:

1. A fiber optic cable shield bond system for use with a fiber optic cable having fiber optic conductors axially located in the cable, a protective jacket enveloping the cable, the protective jacket having a thickness, and a conductive shield disposed intermediate the fiber optic conductors and the protective jacket, the system comprising:
    a cable shield connector including
       a rigid, electrically conductive bond plate,
       at least one ground connector in electrical communication with the bond plate, the at least one ground connector being adapted for penetrating through the thickness of the protective jacket of the fiber optic cable to electrically connect the bond plate to the cable shield, and
       harness assembly mounted to the bond plate, the harness assembly being adapted for mounting to a ground point; and
    at least one hose clamp adapted for mounting the bond plate to the fiber optic cable.

2. The fiber optic cable shield bond system of claim 1, wherein the bond plate defines at least one threaded opening and the at least one ground connector comprises a grounding screw threadable with said at least one threaded opening and including a driving head, a threaded shank axially extending from said head and terminating in a cutting edge which forms the extreme distal tip of said grounding screw.

3. The fiber optic cable shield bond system of claim 2, wherein the shank of the grounding screw defines an axial recess extending from the distal tip to a point intermediate the distal tip and the driving head, the cutting edge defining a sharpened hollow point.

4. The fiber optic cable shield bond system of claim 1, wherein the bond plate includes first and second side portions forming an obtuse angle therebetween, the first and second side portions defining a longitudinal channel with open ends.

5. The fiber optic cable shield bond system of claim 4, wherein the bond plate also includes first and second end portions and a middle portion disposed longitudinally therebetween, the first and second end portions each having a length L1, L2 and the hose clamp having a width W, L1 and L2 being at least equal to W.

6. The fiber optic cable shield bond system of claim 5, wherein the first side portion of the bond plate defines at least one threaded opening and the second side portion defines a threaded opening, the at least one threaded opening and the threaded opening being disposed in the middle portion of the bond plate, and the ground connector comprises a plurality of grounding screws, one of the grounding screws being threadable with the at least one threaded opening and the threaded opening.

7. The fiber optic cable shield bond system of claim 6, wherein the second side portion also defines an unthreaded guide hole disposed in the middle portion of the bond plate.

8. The fiber optic cable shield bond system of claim 1, wherein the harness assembly comprises a electrically conductive flexible cable and a electrically conductive, substantially rigid wire, the flexible cable and rigid wire each having oppositely disposed first and second end portions, the first end portion of the flexible cable being mounted to the bond plate, the second end portion of the flexible cable being mounted to the first end portion of the rigid wire, the second end portion of the wire being adapted for mounting to the ground point.

9. The fiber optic cable shield bond system of claim 8, wherein the bond plate further includes a mounting segment having a base and a pair of wings extending laterally from the base, the first end portion of the flexible cable being positioned adjacent the base of the mounting segment and the wings being crimped into engagement with the first end portion of the flexible cable.

10. A fiber optic cable shield bond system for use with a fiber optic cable having fiber optic conductors axially located in the cable, a protective jacket enveloping the cable, and a conductive shield disposed intermediate the fiber optic conductors and the protective jacket, the system comprising:
    a rigid, electrically conductive bond plate including first and second end portions, a middle portion disposed longitudinally therebetween, and a mounting segment extending from the second end portion, the middle portion defining at least one threaded opening and an unthreaded guide hole;
    a harness assembly including a electrically conductive flexible cable and a electrically conductive, substantially rigid wire, the flexible cable and rigid wire each having oppositely disposed first and second end portions, the first end portion of the flexible cable being mounted to the mounting segment of the bond plate, the second end portion of the flexible cable being mounted to the first end portion of the rigid wire, the second end portion of the wire being adapted for mounting to the ground point at least one grounding screw, a grounding screw being threadable with each of the at least one threaded openings, each grounding screw including a driving head, a threaded shank axially extending from said head and terminating in a cutting edge adapted for piercing the protective jacket of the cable and making electrical contact with the conductive shield of the cable; and at least one hose clamp adapted for mounting one of the end portions of the bond plate to the fiber optic cable.

11. The fiber optic cable shield bond system of claim 10, wherein the shank of the at least one grounding screw defines an axial recess extending from the cutting edge to a point intermediate the cutting edge and the driving head.

12. The fiber optic cable shield bond system of claim 10, wherein the bond plate includes first and second side portions forming an obtuse angle therebetween, the first and second side portions of the bond plate defining at least one threaded opening and the second side portion defining the unthreaded guide hole.

13. The fiber optic cable shield bond system of claim 10, wherein the protective jacket and conductive shield each have a hardness, $H_j$, $H_s$, respectively, the system further comprising a drill bit having a hardness $H_b$, wherein $H_s > H_b > H_j$, the drill bit being adapted for removing a portion of the protective jacket exposed within the guide hole.

* * * * *